United States Patent [19]

Chu

[11] Patent Number: 4,824,911
[45] Date of Patent: Apr. 25, 1989

[54] BLENDS AND MOLDED ARTICLES COMPRISING METHACRYLATE POLYMERS AND VINYLIDENE FLUORIDE - HEXAFLUOROPROPYLENE COPOLYMER

[75] Inventor: Shaw-Chang Chu, Cranbury, N.J.

[73] Assignee: Mobil Oil Corporation, New York, N.Y.

[21] Appl. No.: 88,433

[22] Filed: Aug. 21, 1987

[51] Int. Cl.$^4$ .................. C08L 27/16; C08L 27/20; C08L 33/10; C08L 27/12

[52] U.S. Cl. .................. 525/199; 525/931; 525/194

[58] Field of Search ......................... 525/199

[56] References Cited

U.S. PATENT DOCUMENTS

| | | |
|---|---|---|
| 3,253,060 | 5/1966 | Koblitz et al. . |
| 3,324,069 | 6/1967 | Koblitz et al. .................. 525/199 |
| 3,459,834 | 8/1969 | Schmitt et al. . |
| 4,045,402 | 8/1977 | Bjerk et al. .................. 525/199 |
| 4,348,312 | 9/1982 | Tung . |
| 4,400,487 | 8/1983 | Stoneberg et al. .................. 525/199 |
| 4,581,412 | 4/1986 | Ohmori et al. .................. 525/199 |
| 4,615,848 | 10/1986 | Krueger et al. .................. 525/198 |

FOREIGN PATENT DOCUMENTS 61-275344  12/1986  Japan .................. 525/199

OTHER PUBLICATIONS

Acrylic, *Modern Plastics Encyclopedia* 1985–1986, H. L. Redfoot, pp. 12–16.

*Primary Examiner*—Carman J. Seccuro
*Attorney, Agent, or Firm*—Alexander J. McKillop; Charles J. Speciale; Michael J. Mlotkowski

[57] ABSTRACT

Blending a minor proportion of a copolymer of vinylidene fluoride and hexafluoropropylene with a major proportion of a methacrylate polymer such as polymethylmethacrylate improves the toughness of the methacrylate polymer and gives compositions suitable for molded articles.

7 Claims, No Drawings

BLENDS AND MOLDED ARTICLES COMPRISING METHACRYLATE POLYMERS AND VINYLIDENE FLUORIDE - HEXAFLUOROPROPYLENE COPOLYMER

BACKGROUND OF THE INVENTION

Methacrylate polymers have many desirable properties such as crystal clarity, chemical resistance, ease of fabrication and handling, and weatherability which have resulted in their widespread use in sheets and molded articles.

The strength and toughness characteristics of methacrylate polymers are insufficient for some applications but improvements have been achieved by blending methacrylates with other polymers. For example, as disclosed in *Modern Plastics Encyclopedia*, 1985–1986 polyvinyl chloride has been blended with methacrylates to obtain alloy sheets having high rigidity, dimensional stability and impact-resistance which are thermoformable and easily fabricable. Such alloys, however, are not recommended for exterior use requiring color stability because they tend to yellow.

The toughness characteristics of methacrylates have also been improved by blending with small amounts of polyvinylidene fluoride homopolymer or copolymers thereof containing up to 5 weight percent of another monomer such as disclosed in U.S. Pat. Nos. 3,253,060 and 3,459,834 which are incorporated herein by reference. Blends of methacrylates and small amounts of polyvinylidene fluoride polymer are compatible and exhibit essentially a single transition temperature which is somewhat lower than the transition temperature of the methacrylate component.

Solvent solutions of blends of methacrylates and copolymers of vinylidene fluoride and hexafluoropropylene and films thereof containing glass microspheres are disclosed in U.S. Pat. No. 4,348,312.

In accordance with this invention partially compatible systems suitable for molded articles and the like are obtained with blends of methacrylate polymers and copolymers of vinylidene fluoride and hexafluoropropylene.

SUMMARY OF THE INVENTION

Partially compatible methacrylate polymer blends suitable for extruded and cast sheets and molded articles are obtained with mixtures of methacrylate polymer in which the predominant component is methyl methacrylate, ethyl methacrylate or a mixture thereof, and a copolymer of 60 to 90 weight of vinylidene fluoride and 10 to 40 weight percent of hexafluoropropylene.

DETAILED DESCRIPTION OF THE INVENTION

The first essential component of the polymer blends of this invention is a polymer of methyl or ethyl methacrylate. This component can consist of a pure homopolymer of methyl or ethyl methacrylate or a copolymer of either monomer with minor amounts, i.e. up to about 30%, by weight, of at least one comonomer copolymerizable therewith. Examples of the comonomers which may be utilized with the methyl or ethyl methacrylate, and which can be copolymerize therewith by any known procedure either singly or in a plurality, include such monomers as acrylic acid, methacrylic acid, styrene, substituted styrenes, methyl and ethyl acrylate, acrylonitrile, acrylamide and the like. The preferred first component is polymethylmethacrylate.

The second essential component comprising a copolymer 60 to 90 weight percent vinylidene fluoride and 10 to 40 weight percent hexafluoropropylene is commercially available from du Pont under the trademark "Viton."

The methacrylate polymer is the major component and generally comprises 60 to 95 weight percent of the composition and the minor fluorocarbon copolymer generally comprises 5 to 40 weight percent. Any known procedure may be utilized to blend the components of the compositions with one another with any suitable device. For example, one may utilize a rubber mill, an extruder, a Banbury mixer or the like.

The blends of this invention were found to be partially compatible systems as shown by the shifted glass transition temperatures of the blend components. The partial compatibility leads to substantial retention of the high service temperature and tensile properties of the glassy methacrylate component as well as good interfacial adhesion of the two phases in the blends.

The blends of this invention exhibit excellent toughness as measured by tensile impact strength, for example, and have many of the desirable physical properties of their individual components.

The blends of this invention are curable with known curing agents such as diamines and other curing agents discussed in U.S. Pat. No. 4,257,699 which is incorporated herein by reference. The tensile strength solvent resistance and other properties of the compositions can be improved by curing.

The invention is illustrated by the following examples in which all parts are by weight unless otherwise indicated.

EXAMPLES

Example 1

In a Brabender twin-screw mixer, 36 g of polymethylmethacrylate (Plexiglas V-052 from Rohm and Haas) and 4 g of poly (vinylidene hexafluoropropylene) (Viton A) were melt blended at 180° C. for 5 minutes. The resulting blend has a composition of 90/10 Plexiglas/Viton A.

Example 2

In a manner similar to Example 1, 32 g of Plexiglas V-052 and 8 g of Viton A were mixed to give a blend of 80/20 Plexiglas/Viton A.

Example 3

In a manner similar to Example 1, 28 g of Plexiglas V-052 and 12 g of Viton A were mixed to give a blend of 70/30 Plexiglas/Viton A.

Example 4

In a manner similar to Example 1, 24 g of Plexiglas V-052 and 16 g of Viton A were mixed to give a blend of 60/40 Plexiglas/Viton A.

Example 5

The tensile impact strength of samples prepared from the compositions of Examples 2 and 4 were measured according to ASTM-1822 and compared with the value obtained with a sample containing no Viton A.

| Example | Wt % Viton A | Tensile Impact ft-lb/in.$^2$ |
| --- | --- | --- |
| Control | 0 | 15 |
| 2 | 20 | 18 |
| 4 | 40 | 43 |

I claim:

1. A blend comprising (a) 60 to 95 weight percent of a solid methacrylate polymer in which the predominant component is methyl methacrylate, ethyl methacrylate or a mixture thereof; and (b) 5 to 40 weight percent of a solid fluorocarbon copolymer of 60 to 90 weight percent vinylidene fluoride and 10 to 40 weight percent hexafluoropropylene, wherein said blend of solid polymers is free of glass microspheres and is suitable for preparing molded articles.

2. The blend of claim 1 in which said methacrylate polymer comprises polymethylmethacrylate.

3. The blend of claim 1 in which said methacrylate polymer is a copolymer of methyl methacrylate.

4. The blend of claim 1 in the form of a molded article.

5. The blend of claim 2 in the form of a molded article.

6. The blend of claim 3 in the form of a molded article.

7. The molded article of claim 4 which has been cured with a curing agent.

* * * * *